United States Patent [19]
Keeler

[11] Patent Number: 5,269,259
[45] Date of Patent: Dec. 14, 1993

[54] ROTATING HUMMINGBIRD FEEDER

[76] Inventor: Gene R. Keeler, 9931 E. Eugenia Dr., Tucson, Ariz. 85730

[21] Appl. No.: 34,149

[22] Filed: Mar. 22, 1993

[51] Int. Cl.⁵ ............................................. A01K 39/00
[52] U.S. Cl. ...................................... 119/72; 119/78; 119/57.9; 222/169
[58] Field of Search ................ 119/72, 78, 52.2, 52.3, 119/57.8, 57.9; 222/167, 169, 172, 519, 520, 521

[56] References Cited

U.S. PATENT DOCUMENTS

| | | |
|---|---|---|
| 3,083,873 | 4/1963 | Hirsekorn ............................ 222/167 |
| 3,585,969 | 6/1971 | Crane et al. . |
| 3,874,344 | 4/1975 | Smith . |
| 4,131,083 | 12/1978 | Sokol et al. . |
| 4,323,035 | 4/1982 | Piltch ................................. 119/57.9 |
| 4,441,457 | 4/1984 | Sanford . |
| 4,441,458 | 4/1984 | Mercil . |
| 4,441,459 | 4/1984 | Giordano . |

Primary Examiner—Gene Mancene
Assistant Examiner—Todd E. Manahan
Attorney, Agent, or Firm—Ogram & Teplitz

[57] ABSTRACT

A hummingbird feeder that rotates to position a feeding hole in close proximity to the level of the liquid contained therein. The feeder, basically circular in cross section, is mounted to allow rotation around the axial center of the circular cross section. One face of the feeder has a hole through which the humming birds drink the liquid. Concentric to the hole is a floatation device which maintains the position of the hole in the close proximity to the surface of the liquid. As the liquid level lowers, the entire assembly rotates to maintain the hole position immediately above the liquid level.

20 Claims, 1 Drawing Sheet

ROTATING HUMMINGBIRD FEEDER

BACKGROUND OF THE INVENTION

This invention relates generally to bird feeding devices and more specifically to hummingbird feeders.

Numerous feeders are commercially available. Basically, these can be grouped into two categories. The first category being inverted bottle configurations which rely on atmospheric pressure to maintain the liquid level. The second category uses a flat hollow disc wherein the feeding holes are located in the top disc face, above the liquid level.

There are several problems associated with the present configurations. The inverted bottle type drips liquid as temperature changes and other bird species tip the feeders causing the liquid to spill out. Also, because of the bottleneck, the inverted bottle type are extremely difficult to clean.

The flat hollow disc shaped feeders overcome many of these problems, but the distance between the feeder holes and the surface of the liquid increases as the liquid level drops, making it increasingly difficult for birds to reach the liquid.

Clearly, there exists a need for an improved hummingbird feeder which automatically maintains a feeding hole a proper distance above a liquid, is simple, easily cleaned, easily filled and easily manufactured.

SUMMARY OF THE INVENTION

The invention creates a hummingbird feeder that rotates to position a feeding hole in close proximity to the level of the liquid contained therein.

The feeder, basically circular in cross section, is mounted to allow rotation around the axial center of the circular cross section. One face of the feeder has a feeding hole through which the humming birds drink the liquid. Concentric to the feeding hole is a floatation device which maintains the position of the feeding hole in the close proximity to the surface of the liquid. As the liquid level lowers, the entire assembly rotates to maintain the feeding hole position immediately above the liquid level.

The principal object of this invention is to provide a simple, easy to clean, hummingbird feeder, utilizing a floatation device to position the feeding hole in close proximity to the liquid level and means of support which permits the assembly to rotate as the liquid level lowers.

The significant features of the invention are illustrated in the figures and described more fully below.

BRIEF DESCRIPTION OF THE DRAWINGS

FIG. 2a is a frontal view of the invention when filled with liquid and first mounted.

DETAILED DESCRIPTION OF THE DRAWINGS

Figure 1:
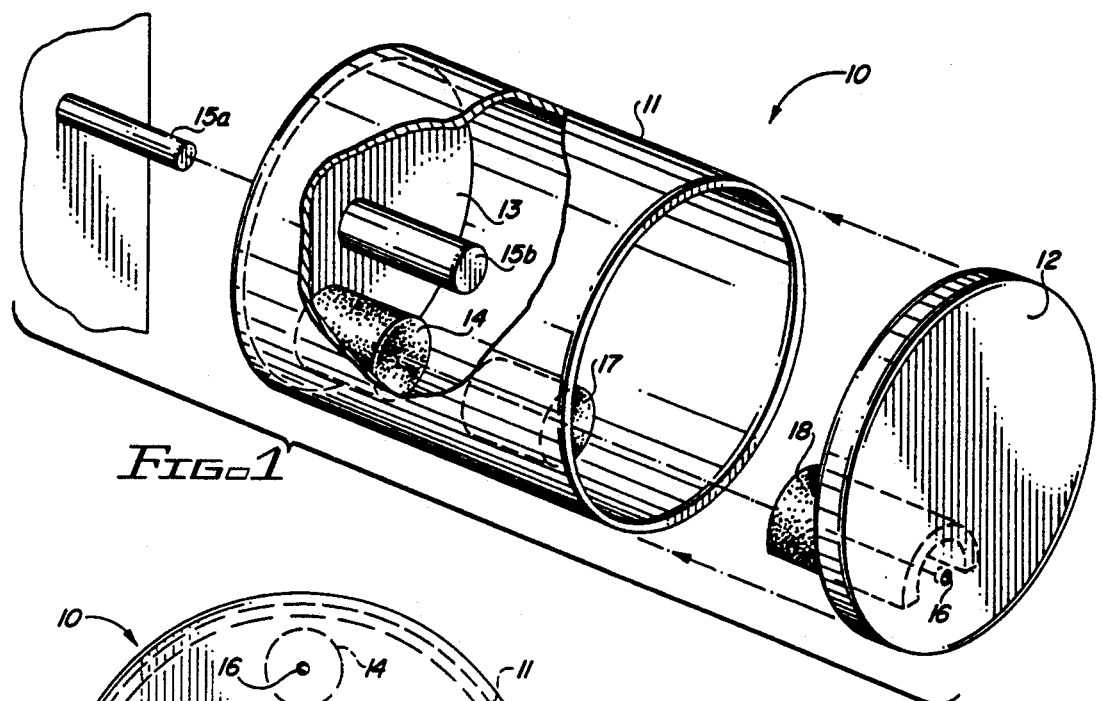
FIG. 1 is a perspective view of the preferred embodiment of the invention.

FIG. 1 is a perspective view of the preferred embodiment of the invention.

Liquid container 10 is comprised of cylindrical body 11, front panel 12 and back panel 13. Float 14 is attached to the interior side of back panel 13. Mounting post 15a is attached to a surface mounting post 15a fits into mounting tube 15b. Feeding hole 16 is located in front panel 12.

Liquid container 10 holds a liquid suitable for use in a bird feeder. When front panel 12 is attached to cylindrical body 11, container 10 is water tight except for feeding hole 16. Liquid container 10 is preferably made out of molded plastic.

In the preferred embodiment, front panel 12 is removable from cylindrical body 11. The removable front panel 12 permits container 10 to be easily cleaned and refilled.

Float 14 is attached to the interior side of back panel 13. Float 14 is positioned away from the center of back panel 13. This "off center" position of float 14 permits float 14 to rotate container 10 in response to fluid level/changes in container 10. The rotating operation of container 10 and float 14 is described in more detail below.

Those of ordinary skill in the art readily see that float 14 can be mounted in a variety of ways that achieve substantially the same result. These include, but are not limited to, mounting float 14 on the interior of cylindrical body 11, as shown by 17, and on the interior side of front panel 12, as shown by 18.

Floats are well known in the art. Float 14 is an ordinary float of adequate size and shape suitable for use in the invention. Float is made of any of a variety of materials including, but not limited to, plastic, cork, rubber, plastic foam, wood, metal, or the like.

Feeding hole 16 permits humming birds to retrieve liquid from inside container 10. Feeding hole 16 is positioned concentric with float 14. The concentric position of feeding hole 16 and float 14 is vital to the operation of the invention. As the fluid level in container 10 changes, container 10 rotates keeping float 14 resting in the fluid. Because feeding hole 16 is concentric to float 14, feeding hole remains slightly above the fluid level.

Container 10 is rotatably mounted to a surface. This is easily accomplished with a variety of mounting devices commonly known in the art. The preferred embodiment uses a mounting post 15a and a mounting tube 15b. This arrangement permits container 10 to easily rotate and to be removed for cleaning and filling.

Mounting post 15a attaches to a surface. Mounting post 15a extends horizontally from the surface. Mounting tube 15b is attached to the center of back panel 13. Mounting tube 15b is slightly larger diameter than mounting post 15a and thus allows mounting post 15a to be inserted into mounting tube 15b.

Figure 2B:
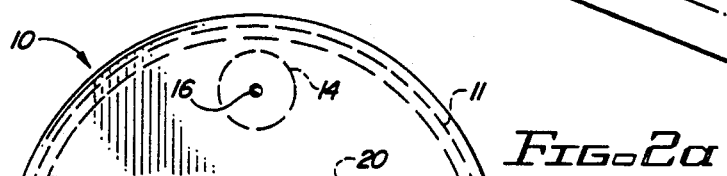
FIG. 2b is a frontal view of the invention when nearly filled with liquid and after mounting.
Figure 2B:
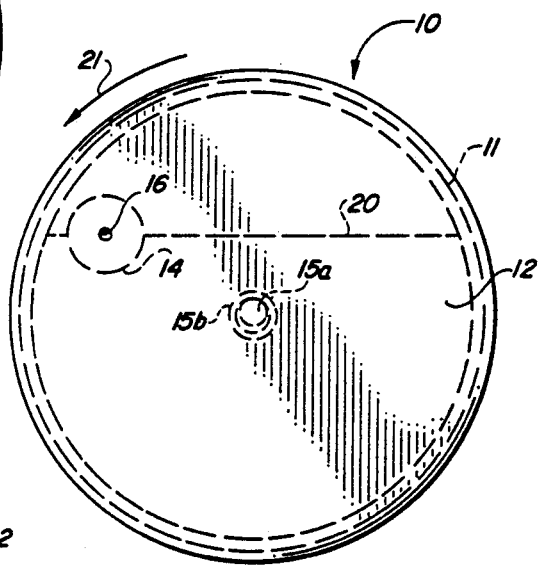
Figure 2C:
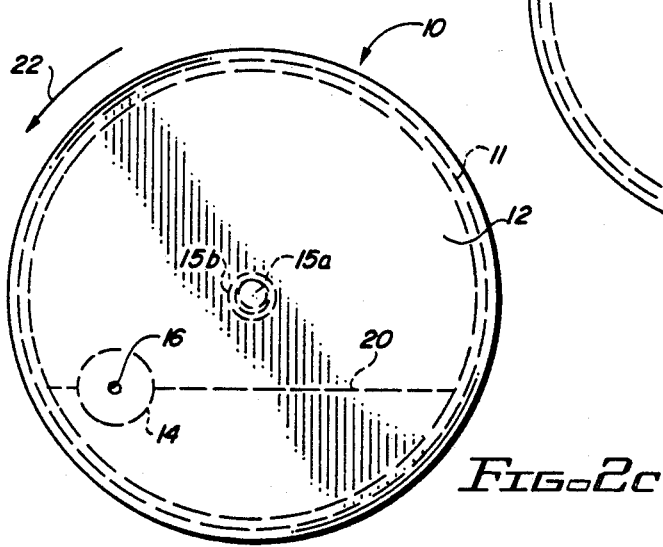
FIG. 2c is a frontal view of the invention when nearly empty of liquid.

FIGS. 2a, 2b, and 2c, are front views showing the operation of the invention.

FIG. 2a shows the invention when nearly filled with liquid and ready to be mounted. Float 14 is positioned above the fluid level 20. Feeding hole 16 is concentric with float 14 mounting tube 15b and front panel are shown.

FIG. 2b shows the invention nearly filled with liquid and after mounting. When container 10 is mounted on mounting post (not shown), the weight of float 14 causes container 10 to rotate as shown by arrow 21 and float 14 falls into the fluid. More than half of float 14 remains above fluid level 20.

Because feeding hole 16 is concentric with float 14, feeding hole is positioned slightly above fluid level 20.

FIG. 2c shows the invention when nearly empty of fluid. As fluid level 21 drops, due to birds feeding or through evaporation, etc., container 10 rotates as shown by arrow 22. Float 14 remains resting on the fluid with more than half of float 14 above fluid level 20. Feeding hole 16 also remains positioned slightly above fluid level 20.

The invention automatically keeps feeding hole 16 positioned above fluid level 20. As fluid level 20 changes, container 10 rotates keeping the feeding hole 16 positioned slightly above the fluid level 20. This automatic positioning of the feeding hole is a significant improvement over the known prior art. The invention can be filled with a liquid, mounted, and left unattended for long periods of time. The invention is simple, easily cleaned and filled, and easily manufactured.

It is clear from the foregoing that the present invention represents a new and useful device for feeding humming birds and the like.

What is claimed is:

1. A hummingbird feeder comprising:
   (a) a fluid holding container, said container having,
      (1) a cylindrical body having a first end and a second end,
      (2) a front panel, said front panel covering said first end of said cylindrical body, and,
      (3) a back panel, said back panel covering said second end of said cylindrical body;
   (b) a mounting means for rotatably mounting said container to a surface;
   (c) a float means for floating on a fluid and for rotating said container in response to a change in fluid level in said container, said float means attached to an interior side of said back panel; and,
   (d) a feeding hole in said front panel, said feeding hole and said float means being axially aligned such that said feeding hole is maintained slightly above a fluid in said container.

2. The hummingbird feeder according to claim 1 wherein said front panel is removable from said cylindrical body.

3. The hummingbird feeder according to claim 2 wherein said mounting means comprises:
   (a) a substantially horizontal post attached to a surface; and,
   (b) a hollow tube formed in the center of said back panel and protruding into the interior of said container, said post fitting into said hollow tube.

4. The hummingbird feeder according to claim 3 wherein said feeding hole is located near the periphery of said front panel.

5. The hummingbird feeder according to claim 4 wherein said back panel is removable from said container.

6. The hummingbird feeder according to claim 5 wherein said float means is attached to said front panel.

7. The hummingbird feeder according to claim 5 wherein said float means is attached to said cylindrical body.

8. The hummingbird feeder according to claim 1 wherein said container is made of molded plastic.

9. A rotating hummingbird feeder comprising:
   (a) a container having,
      (1) a body portion, said body portion being cylindrical and having a first end and a second end,
      (2) a front panel, said front panel attached to said first end of said body portion, and,
      (3) a back panel, said back panel attached to said second end of said body portion, said back panel having an interior side and an exterior side;
   (b) a rotating mounting means for rotatably mounting said container to a surface, said rotating mounting means attached to said back panel;
   (c) a float attached to said interior side of said back panel, said float attached away from the center of said interior side of said back panel; and,
   (d) a feeding hole located in said front panel and concentric with said float such that said feeding hole remains above a fluid level in said container as the fluid level changes.

10. The rotating hummingbird feeder according to claim 9 wherein said front panel is removable from said body portion.

11. The rotating hummingbird feeder according to claim 10 wherein said mounting means comprises:
    (a) a horizontal mounting post attached to a surface; and,
    (b) a hollow mounting tube attached to the center of said back panel, said post fitting into said hollow tube and allowing said container to rotate freely about said horizontal post.

12. The rotating hummingbird feeder according to claim 10 wherein said mounting means is attached to the center of said back panel.

13. A hummingbird feeding device comprising:
    (a) a rotating container capable of holding a fluid, said container comprising:
       (1) a cylindrical body portion, said body portion having a first end and a second end,
       (2) a front panel attached to said first end of said body portion, and,
       (3) a back panel attached to said second end of said body portion;
    (b) a rotatable mounting means for rotatably mounting said container to a support, said mounting means attached to said back panel;
    (c) float means for floating on a fluid in sad container and for rotating said container in response to fluid level changes in said container, said float means mounted on an interior surface of said rotating container; and,
    (d) a feeding opening located in said front panel, said opening being aligned with said float means such that said opening maintains a constant distance above said fluid in said container.

14. The hummingbird feeding device according to claim 13 wherein said front panel is removable from said body portion.

15. The hummingbird feeding device according to claim 14 wherein said mounting means comprises:
    (a) a horizontal post attached to a surface; and,
    (b) a hollow tube attached to the center of said back panel and protruding into the interior of said container, said post fitting into said hollow tube and allowing said container to rotate freely about said post.

16. The hummingbird feeding device according to claim 15 wherein said float means is attached to said front panel.

17. The hummingbird feeding device according to claim 16 wherein said float means is attached to said cylindrical body portion.

18. A hummingbird feeder apparatus comprising:
    (a) a container, said container having,
       (1) a cylindrical body portion having a first end and a second end,
       (2) a front panel attached to said first end, and, (3) a back panel attached to said second end, said back panel having an interior surface and an exterior surface;

(b) a mounting means for rotatably mounting said back panel to a surface;

(c) an opening in said front panel, said opening located away from the center of said front panel; and, (d) float means for floating on a fluid in said container and for rotating said container as said fluid level changes, said float means attached to said interior surface of said back panel.

19. The hummingbird feeder apparatus according to claim 18 wherein said opening and said float means are concentric.

20. The hummingbird feeder apparatus according to claim 19 wherein said mounting means comprises:

(a) a horizontal mounting post attached to a surface; and, (b) a mounting tube attached to the center of said back panel, said mounting post fitting into said mounting tube and allowing said container to rotate about said mounting post.

* * * * *